(12) United States Patent
Isogai et al.

(10) Patent No.: US 9,596,445 B2
(45) Date of Patent: Mar. 14, 2017

(54) DIFFERENT-VIEW IMAGE GENERATING APPARATUS AND DIFFERENT-VIEW IMAGE GENERATING METHOD

(71) Applicant: Panasonic Corporation, Osaka (JP)

(72) Inventors: Kuniaki Isogai, Osaka (JP); Yusuke Monobe, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 323 days.

(21) Appl. No.: 14/374,379

(22) PCT Filed: Oct. 16, 2013

(86) PCT No.: PCT/JP2013/006141
§ 371 (c)(1),
(2) Date: Jul. 24, 2014

(87) PCT Pub. No.: WO2014/083752
PCT Pub. Date: Jun. 5, 2014

(65) Prior Publication Data
US 2015/0109409 A1  Apr. 23, 2015

(30) Foreign Application Priority Data
Nov. 30, 2012 (JP) .................... 2012-263627

(51) Int. Cl.
H04N 13/00 (2006.01)
G06T 15/20 (2011.01)

(52) U.S. Cl.
CPC ....... *H04N 13/0011* (2013.01); *G06T 15/205* (2013.01); *H04N 13/0022* (2013.01)

(58) Field of Classification Search
None
See application file for complete search history.

(56) References Cited

U.S. PATENT DOCUMENTS 8,395,642 B2  3/2013  Yea et al.
9,183,669 B2  11/2015  Liu et al.
(Continued)

FOREIGN PATENT DOCUMENTS

CN  102325259     1/2012
CN  102325259 A * 1/2012  ............. G06T 15/20
(Continued)

OTHER PUBLICATIONS

International Search Report issued Dec. 24, 2013 in International Application No. PCT/JP2013/006141.
(Continued)

*Primary Examiner* — James M Anderson, II
(74) *Attorney, Agent, or Firm* — Wenderoth, Lind & Ponack, L.L.P.

(57) ABSTRACT

An apparatus includes: a generating unit which generates, from each of images respectively obtained at viewpoint positions, one of different-viewpoint images which corresponds to an image at a virtual viewpoint position different from the viewpoint positions, the different-viewpoint image including a hole area in which a pixel value is missing; a calculating unit which calculates, for each of processing units respectively in predetermined areas in the different-viewpoint images, a hole density indicating, with respect to the predetermined area, a ratio of one of the hole areas in the processing units in the different-viewpoint images; a calculating unit which calculates, for each processing unit, a combination ratio of the different-viewpoint image, based on the hole density of the processing unit co-located with an other one of the processing units in an other one of the different-viewpoint images; and a combining unit which combines the different-viewpoint images, based on the combination ratios.

10 Claims, 14 Drawing Sheets

(56) References Cited

U.S. PATENT DOCUMENTS

| | | |
|---|---|---|
| 2010/0238160 A1 | 9/2010 | Yea et al. |
| 2011/0148858 A1* | 6/2011 | Ni .................... H04N 13/0011 345/419 |
| 2011/0157229 A1 | 6/2011 | Ni et al. |
| 2013/0063576 A1 | 3/2013 | Okubo et al. |
| 2013/0076749 A1 | 3/2013 | Maeda et al. |
| 2013/0106848 A1 | 5/2013 | Nguyen et al. |
| 2015/0221126 A1 | 8/2015 | Liu et al. |

FOREIGN PATENT DOCUMENTS

| | | |
|---|---|---|
| JP | 2010-218548 | 9/2010 |
| JP | 2012-501494 | 1/2012 |
| JP | 2012-73702 | 4/2012 |
| WO | 2010/024938 | 3/2010 |
| WO | 2012/147329 | 11/2012 |
| WO | 2012/153513 | 11/2012 |
| WO | 2013/005365 | 1/2013 |

OTHER PUBLICATIONS

Office Action issued Jun. 3, 2016 in corresponding Chinese patent application No. 201380006913.8 (with English translation of search report).

\* cited by examiner

DIFFERENT-VIEW IMAGE GENERATING APPARATUS AND DIFFERENT-VIEW IMAGE GENERATING METHOD

TECHNICAL FIELD

The present disclosure relates to an image processing technique for three-dimensional (3D) display, and particularly to a different-viewpoint image generating apparatus which generates, from two or more images captured at mutually different viewpoint positions, different-viewpoint images having viewpoint positions different from those of the respective two or more images.

BACKGROUND ART

There are known techniques for displaying images providing a disparity (hereinafter, also referred to as stereo images) to right and left eyes of a viewer, and thereby allowing the viewer to view planar videos as a stereoscopic video.

There are also techniques for generating, from a pair of stereoscopic images, images having viewpoints different from those of the pair (different-viewpoint images) (for example, see Patent Literature 1).

The technique disclosed in Patent Literature 1 is a technique for generating such different-viewpoint images by shifting pixels in horizontal directions in images according to distances in depth directions in the images using depth maps indicating distances in the depth directions. This technique is generally called as Depth Image Based Rendering (DIBR).

The images generated using the DIBR may include areas which do not appear in the original stereoscopic images. The areas do not have assigned pixel values (hereinafter, referred to as hole areas), and thus need to be interpolated using some interpolation process.

CITATION LIST

Patent Literature

[PTL 1]
Japanese Unexamined Patent Application. Publication No. 2010-218548

SUMMARY OF INVENTION

Technical Problem

In view of this, the present disclosure provides a different-viewpoint image generating apparatus capable of interpolating hole areas in different-viewpoint images to generate high-quality images.

Solution to Problem

A different-viewpoint image generating apparatus according to an aspect of the present disclosure includes: a different-viewpoint image generating unit configured to generate, from each of two or more images respectively obtained at two or more viewpoint positions, one of two or more different-viewpoint images which correspond to an image obtainable at a virtual viewpoint position different from the two or more viewpoint positions, based on distance information indicating a depth of a pixel in one of the two or more images, the one of the two or more different-viewpoint images including a hole area in which a pixel value is missing; a hole density calculating unit configured to calculate, for each of processing units respectively in predetermined areas in the two or more different-viewpoint images, a hole density indicating, with respect to the predetermined area, a ratio of one of the hole areas in the processing units in the two or more different-viewpoint images, the processing unit being made up of one or more pixels; a combination ratio calculating unit configured to calculate, for each of the processing units, a combination ratio of one of the two or more different-viewpoint images, based on the hole density of the processing unit which is co-located with an other one of the processing, units in an other one of the two or more different-viewpoint images; and a different-viewpoint image combining unit configured to combine the two or more different-viewpoint images, based on the combination ratios of the processing units.

These general and specific aspects may be implemented by arbitrarily combining a system, a method, an integrated circuit, a computer program, or a recording medium such as a CD-ROM, or any combination of systems, methods, integrated circuits, computer programs or recording media.

Advantageous Effects of Invention

The different-viewpoint image generating apparatus according to the present disclosure is capable of interpolating hole areas in different-viewpoint images to generate high-quality images.

Figure 1:
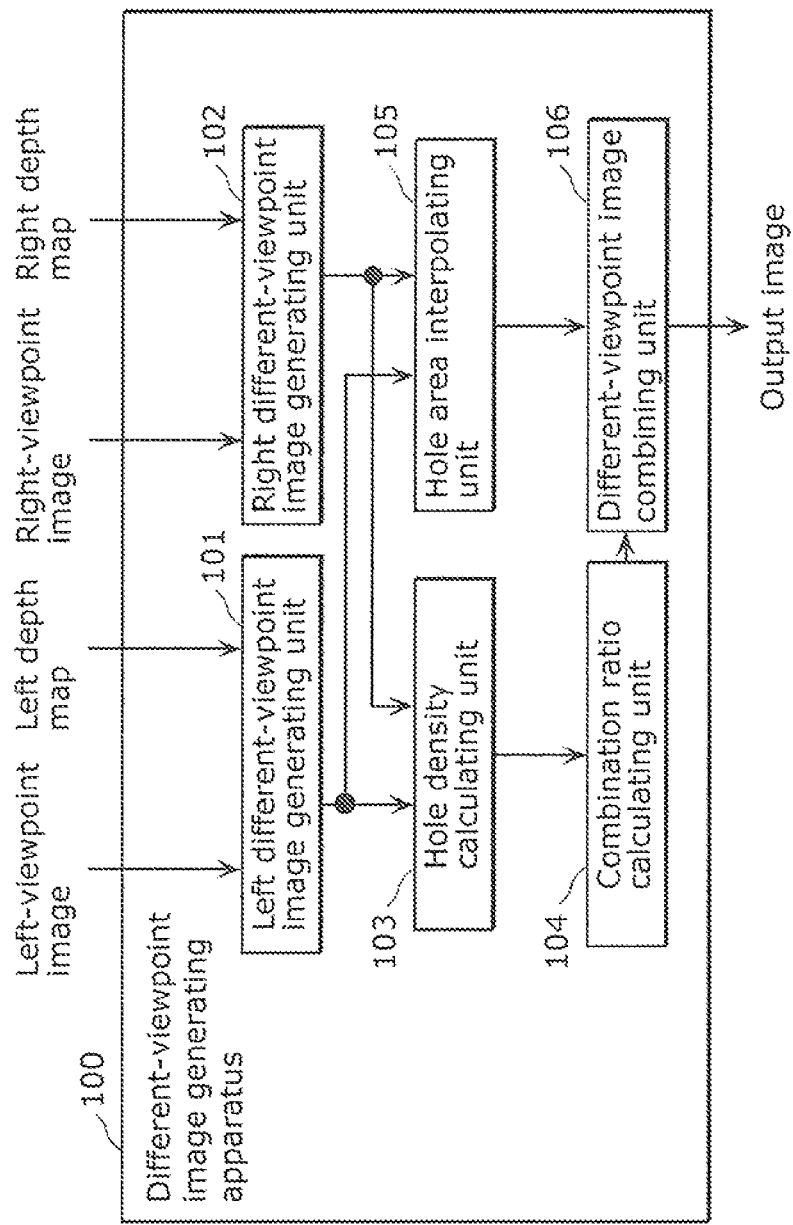
FIG. 1 is a diagram showing an overall structure of a different-viewpoint image generating apparatus according to an embodiment.

DESCRIPTION OF EMBODIMENTS (Underlying Knowledge Forming Basis of the Present Disclosure)

There are various techniques as methods for displaying stereoscopic videos such as 3D movies and 3D television programs. These techniques are common in the point of allowing viewers to recognize planar videos as stereoscopic videos by displaying stereoscopic images providing disparities to right and left eyes of viewers. A pair of stereoscopic images having a larger disparity provides a more stereoscopic view to the right and left eyes of a viewer when displayed. On the other hand, a pair of stereoscopic images having a smaller disparity provides a less stereoscopic view to the viewer.

A disparity between captured stereoscopic images is determined according to an inter-lens distance of stereo cameras used to capture stereoscopic images. It is desirable that the disparity of the stereoscopic images be designed to be adjusted later to adjust stereoscopic vision.

In addition, naked-eye 3D display using lenticular lenses is for displaying stereoscopic images having viewpoint positions which differ according to the positions of viewers. In such a case, in order to switch stereoscopic images to be displayed naturally, images captured at many viewpoint positions need to be captured in advance. However, such image capturing at many viewpoint positions requires high cost. Accordingly, it is necessary to generate images having different viewpoint positions by modifying stereoscopic images.

Here, as described in the Background Art, the known DIBR is intended to generate, from stereoscopic images, different-viewpoint images having viewpoints different from those of the stereoscopic images.

The images generated using the DIBR may include hole areas without assigned pixel values, and such hole areas need to be interpolated using some interpolation process.

The hole areas can be simply interpolated according, to a linear interpolation process using pixel values of pixels in peripheral areas of the hole areas. However, in the case of a large hole area, a linear interpolation process results in a reduction in the image quality.

On the other hand, the technique disclosed in Patent Literature 1 is a technique for interpolating a hole area in a different-viewpoint image generated from a left-viewpoint image that constitutes a stereoscopic image together with a right-viewpoint image by assigning pixel values of a corresponding area in the right-viewpoint image.

However, since the technique disclosed in Patent Literature 1 is intended to directly assign, to a hole area in an image, the pixel values of pixels in an opposite-viewpoint image, the boundary between the hole area and the peripheral area after the interpolation do not connect seamlessly.

In order to solve the above problem, a different-viewpoint image generating apparatus according to an aspect of the present disclosure includes: a different-viewpoint image generating unit configured to generate, from each of two or more images respectively obtained at two or more viewpoint positions, one of two or more different-viewpoint images which correspond to an image obtainable at a virtual viewpoint position different from the two or more viewpoint positions, based on distance information indicating a depth of a pixel in one of the two or more images, the one of the two or more different-viewpoint images including a hole area in which a pixel value is missing; a hole density calculating unit configured to calculate, for each of processing units respectively in predetermined areas in the two or more different-viewpoint images, a hole density indicating, with respect to the predetermined area, a ratio of one of the hole areas in the processing units in the two or more different-viewpoint images, the processing unit being made up of one or more pixels; a combination ratio calculating unit configured to calculate, for each of the processing units, a combination ratio of one of the two or more different-viewpoint images, based on the hole density of the processing unit which is co-located with an other one of the processing units in an other one of the two or more different-viewpoint images; and a different-viewpoint image combining unit configured to combine the two or more different-viewpoint images, based on the combination ratios of the processing units.

In this way, it is possible to interpolate precisely the hole areas formed when the different-viewpoint images are generated. Accordingly, it is possible to generate the different-viewpoint images which have high quality from the two or more images.

In addition, the different-viewpoint image generating apparatus may further include a hole area interpolating unit configured to interpolate each of the hole areas in the two or more different-viewpoint images, using pixel values within a corresponding one of the two or more different-viewpoint images, wherein the different-viewpoint image combining unit may be configured to combine the two or more different-viewpoint images including the interpolated hole areas, based on the combination ratios.

In addition, the different-viewpoint image generating apparatus may further include a hole area interpolating unit configured to interpolate the hole areas within images combined by the different-viewpoint image combining unit, using pixel values within the images.

In addition, the hole density calculating unit may be configured to calculate, as a plurality of the hole densities of the co-located processing units in the two or more different-viewpoint images, a plurality of the ratios of the hole areas in windows which are the predetermined areas having the co-located processing units as centers of the predetermined areas.

In addition, the hole density calculating unit may be configured to calculate a plurality of the hole densities by adding different weights to a hole area located at a central part of the window and a hole area located at a peripheral part of the window.

In addition, the combination ratio calculating unit may be configured to calculate, for the co-located processing units in the two or more different-viewpoint images, a plurality of the combination ratios which become larger as a plurality of the hole densities of the co-located processing units become smaller.

In addition, when hole densities of co-located processing units are equal to each other between the two or more different-viewpoint images, the combination ratio calculating unit may be configured to calculate, for the co-located processing units having the equal hole densities, combination ratios which become larger as the positions of the two or more different-viewpoint images become closer to the position of the virtual viewpoint position.

In addition, the processing unit may be a pixel, the hole density calculating unit may be configured to calculate a hole density for each of pixels co-located in the two or more different-viewpoint images, and the combination ratio calculating unit may be configured to calculate, for each of the co-located pixels, the combination ratio of one of the two or more different-viewpoint images.

These general and specific aspects may be implemented by arbitrarily combining a system, a method, an integrated circuit, a computer program, or a computer-readable recording medium such as a CD-ROM, or any combination of systems, methods, integrated circuits, computer programs, or computer-readable recording media.

Hereinafter, embodiments are described with reference to the drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the present disclosure. Therefore, among the structural elements in the following exemplary embodiments, structural elements not recited in any one of the independent claims which define the most generic concept are described as arbitrary structural elements.

Embodiment

FIG. 1 is a diagram showing an overall structure of a different-viewpoint image generating apparatus 100 according to an embodiment.

The different-viewpoint image generating apparatus 100 includes a left different-viewpoint image generating unit 101, a right different-viewpoint image generating unit 102, a hole density calculating unit 103, a combination ratio calculating unit 104, a hole area interpolating unit 105, and a different-viewpoint image combining unit 106. This embodiment describes an example in which the different-viewpoint image generating apparatus 100 generates different-viewpoint images from a left-viewpoint image and a right-viewpoint image which constitute a stereoscopic image.

The left different-viewpoint image generating unit 101 generates a left different-viewpoint image by shifting each of pixels in the left-viewpoint image in a horizontal direction based on the depth of the pixel, based on the left-viewpoint image and a depth map (a left depth map) of the left-viewpoint image.

The right different-viewpoint image generating unit 102 generates a right different-viewpoint image by shifting each of pixels in the right-viewpoint image in a horizontal direction based on the depth of the pixel, based on the right-viewpoint image and a depth map (a right depth map) of the right-viewpoint image.

Here the left-viewpoint image is an image captured at a left-viewpoint position, and the right-viewpoint image is an image captured at a right-viewpoint position different from the left-viewpoint position. In addition, the left different-viewpoint image and the right different-viewpoint image are images corresponding to an image obtainable at the same virtual viewpoint position (the position different from any of the left-viewpoint position and the right-viewpoint position). The depth map is distance information indicating the depth of each pixel in each of the images (the distance from a viewpoint position to a subject presented by the pixel).

The left different-viewpoint image generating unit 101 and the right different-viewpoint image generating unit 102 do not always need to be configured separately as shown in FIG. 1. In other words, a single different-viewpoint image generating unit may generate a left different-viewpoint image and a right different-viewpoint image from the left- and right-viewpoint images and the depth maps thereof. More specifically, the different-viewpoint image generating unit generates, from each of the two images obtained at two viewpoint positions, one different-viewpoint image corresponding to an image obtainable at a virtual viewpoint position different from the viewpoint position of the corresponding one of the two images, based on distance information indicating the depth of each pixel in the image.

The hole density calculating unit 103 generates a hole density map indicating a distribution of hole areas for each of processing units in each of the left different-viewpoint image and the right different-viewpoint image respectively generated by the left different-viewpoint image generating unit 101 and the right different-viewpoint image generating unit 102. More specifically, the hole density calculating unit 103 calculates, for each of the generated two different-viewpoint images, a hole density which is an occupation percentage of the hole areas in a predetermined area including the processing unit, for each processing unit made up of one or more pixels. Here, a hole area is an area without any pixel value in a different-viewpoint image.

In this embodiment, the processing unit is made of one or more pixels. The hole density calculating unit 103 calculates a hole density for each pixel in each of the two different-viewpoint images. In this embodiment, a later-described window is used as the predetermined area.

The combination ratio calculating unit 104 generates a combination ratio, map indicating a ratio at the time of combining the left different-viewpoint image and the right different-viewpoint image, based on the hole density maps generated by the hole density calculating unit 103. More specifically, the combination ratio calculating unit 104 compares, for each set of co-located pixels (processing units) in the two different-viewpoint images, the magnitudes of the hole densities of the pixels in the pair, and calculates, for each pair of the pixels (processing unit), a combination ratio between the two different-viewpoint images according to the magnitudes of the compared hole densities.

The hole area, interpolating unit 105 performs a hole embedment process for interpolating a hole area in an image using pixel values located around the hole area within the same image, for each of the left different-viewpoint image and the right different-viewpoint image respectively generated by the left different-viewpoint image generating unit 101 and the right different-viewpoint image generating unit 102. In other words, the hole area interpolating unit 105 interpolates each of the hole areas of the two different-viewpoint images using the pixel values within the corresponding one of the different-viewpoint images.

Here, a pixel value is information indicating at least a luminance and a color of a pixel. Specifically, the pixel value is information composed of luminance values of RGB color components, information composed of luminance and chrominance values, or the like. In addition, the pixel values may include supplemental information such as depth values in addition to information related to colors.

The different-viewpoint image combining unit 106 generates an output image (an output different-viewpoint image) by combining the left different-viewpoint image and the right different-viewpoint image after the hole embedment process by the hole area interpolating unit 105, based on the combination ratio shown by the combination ratio map generated by the combination ratio calculating unit 104, More specifically, the different-viewpoint image combining unit 106 combines the two different-viewpoint images with the hole areas interpolated, based on the calculated combination ratio.

Here, the structural elements of the different-viewpoint image generating apparatus 100 may be configured with an exclusive hardware, or may be realized by executing a software program suitable for each of the structural elements. Each of the structural elements may be realized by means of the program executing unit such as a CPU or a processor reading and executing a software program recorded on a recording medium such as a hard disk or a semiconductor memory.

Next, a detailed description is given of operations performed by the structural elements of the different-viewpoint image generating apparatus 100, First, detailed descriptions are given of how the left different-viewpoint image generating unit 101 and the right different-viewpoint image generating unit 102 perform processes for generating different-viewpoint images.

Figure 2:
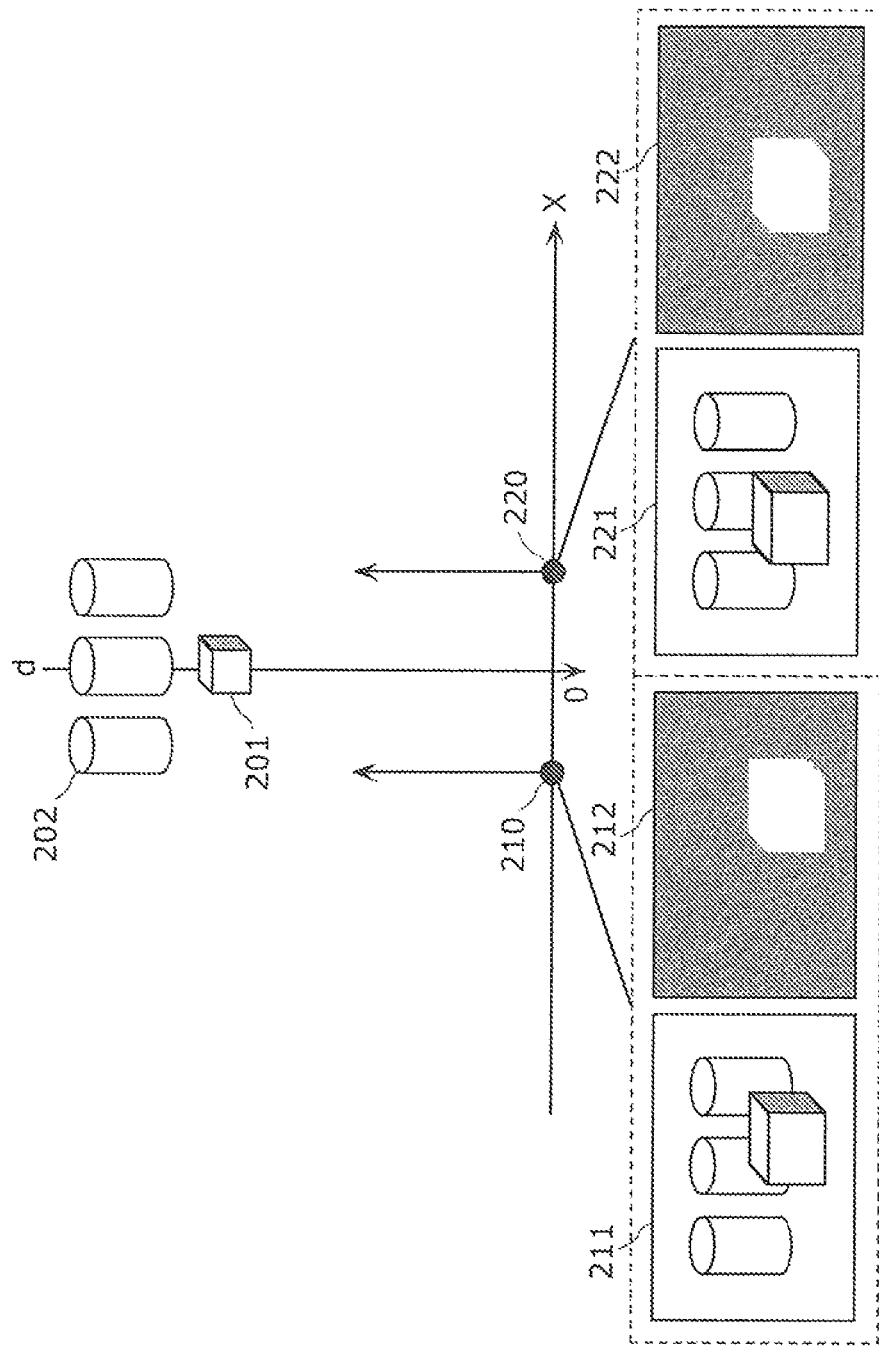
FIG. 2 is a diagram showing examples of images and depth maps which are input to different-viewpoint image generating unit.

FIG. 2 is a diagram showing examples of images and depth maps to be input to the left different-viewpoint image generating unit 101 and the right different-viewpoint image generating unit 102.

The left-viewpoint image 211 is an image obtained by capturing a subject 201 and a subject 202 at a left-viewpoint position 210. The right-viewpoint image 221 is an image obtained by capturing a subject 201 and a subject 202 at a right-viewpoint position 220. The left-viewpoint image 211 and the right-viewpoint image 221 are images for stereoscopic viewpoints obtained by capturing images of the same subjects 201 and 202 located at relatively different positions in the images.

The left depth map 212 is an image showing the background of a left-viewpoint image 211 and the depth of the subject 201. The right depth map 222 is an image showing the background of a right-viewpoint image 221 and the depth of the subject 201. In other words, the left depth map 212 shows a distance from the left-viewpoint position 210 to the subject 201, and the right depth map 222 shows a distance from the right-viewpoint position 220 to the subject 201. For simplification, the depth of the subject 202 is not shown in this embodiment although it is also shown in the left depth map 212 and the right depth map 222 in reality.

Here, in the depth map in this embodiment, a pixel presenting a subject located closer to a viewpoint position is a bright pixel having a higher luminance value, and a pixel presenting a subject located farther from the viewpoint position is a dark pixel having a lower luminance value.

The left different-viewpoint image generating unit 101 generates a left different-viewpoint image corresponding to an image obtainable at a virtual viewpoint position, from the left-viewpoint image and the left depth map as shown in FIG. 2. Likewise, the right different-viewpoint image generating unit 102 generates a right different-viewpoint image corresponding to an image obtainable at a virtual viewpoint position, from the right-viewpoint image and the right depth map as shown in FIG. 2.

Figure 3:
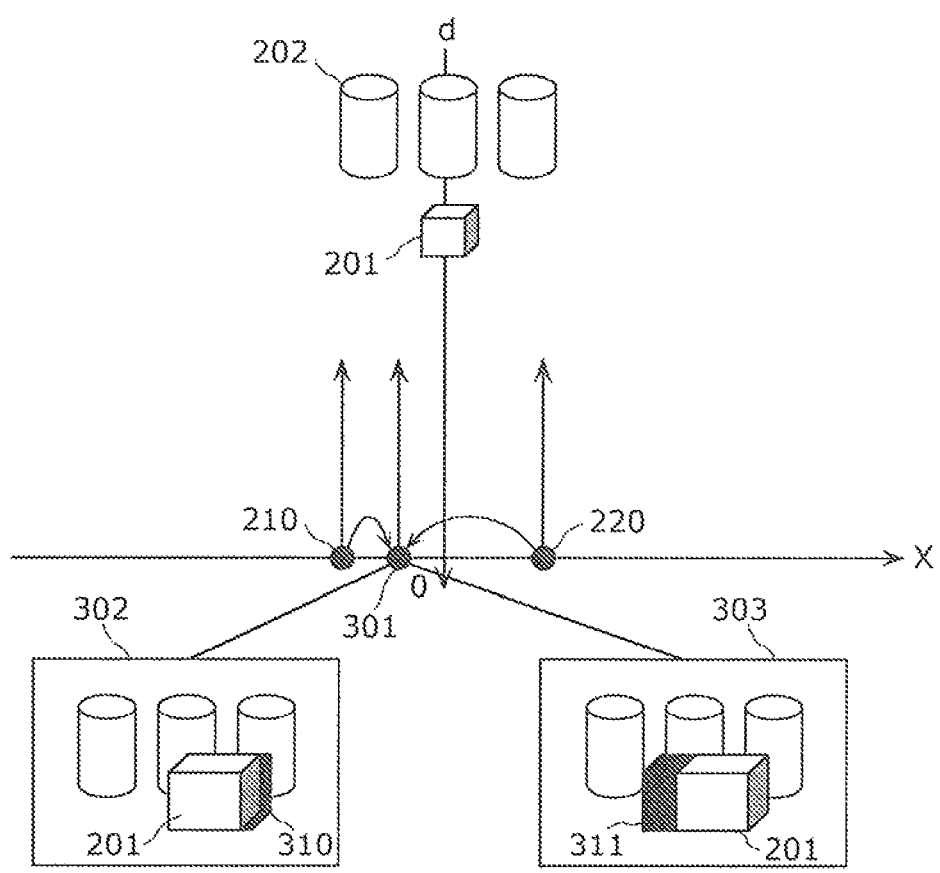
FIG. 3 is a diagram showing different-viewpoint mages which are generated by the different-viewpoint image generating unit.

FIG. 3 is a diagram showing the left different-viewpoint image generated by the left different-viewpoint image generating unit 101 and the right different-viewpoint image generated by the right different-viewpoint image generating unit 102.

In general, the subject 201 closer from the viewpoint position has a large amount of shift due to the difference in the viewpoint position than the subject 202 farther from the viewpoint position. In consideration of this, the left different-viewpoint image generating unit 101 and the right different-viewpoint image generating unit 102 shift the pixels in the input images in the horizontal direction considering the distances from the viewpoint position of the input images (the left-viewpoint image 211 and the right-viewpoint image 221) to the virtual viewpoint position. At this time, the left different-viewpoint image generating unit 101 and the right different-viewpoint image generating unit 102 adjust the amount of shift of each pixel according to the distance in the depth direction in the image using the depth map showing the distance in the depth direction.

As shown in FIG. 3, the left different-viewpoint image generating unit 101 generates a left different-viewpoint image 302 corresponding to an image obtainable by capturing the images of the subjects 201 and 202 at the virtual viewpoint position 301. In addition, the right different-viewpoint image generating unit 102 generates a right different-viewpoint image 303 obtainable by capturing the images of the subjects 201 and 202 at the virtual viewpoint position 301.

Here, as described above, when the viewpoint position is shifted from the left-viewpoint position 210 to the virtual-viewpoint position 301, the amount of shift of the subject 201 located frontward is larger than the amount of shift of the subject 202 located backward. The same applies to a case where a viewpoint position is shifted from the right-viewpoint position 220 to the virtual viewpoint position 301, except for the point that the shift direction is opposite. In other words, the shift amount Δx of the pixel value of each pixel with the shift of the viewpoint position is calculated according to Expression 1 below.

$$\Delta x = d \cdot \Delta b \qquad \text{(Expression 1)}$$

Here, d denotes a depth value (a value in the depth map) of each pixel, and decreases for a backward viewpoint position and increases for a frontward viewpoint position. Here, Δb denotes the amount of shift in the viewpoint position (either the amount of shift from the left-viewpoint position 210 to the virtual viewpoint position 301 or the amount of shift from the right-viewpoint position 220 to the virtual viewpoint position 301).

A pixel value having a larger depth value d has a larger value of the amount of shift Δx, resulting in a hole area without any pixel value at a side of the subject 201 in each of the left different-viewpoint image 302 and the right different-viewpoint image 303 after the shift of viewpoints. More specifically, the left different-viewpoint image 302 generated from the left-viewpoint image 211 has a hole area 310 at the right side of the subject 201 in the image, and the right different-viewpoint image 303 generated from the right-viewpoint image 221 has a hole area 311 at the left side of the subject 201 in the image.

In reality, a hole area is generated also at a side of the subject 202 in the image except for a case where the subject 202 is located at the same distance as the background. However, in FIG. 3, the hole area generated around the subject 202 is not shown.

Figure 4:
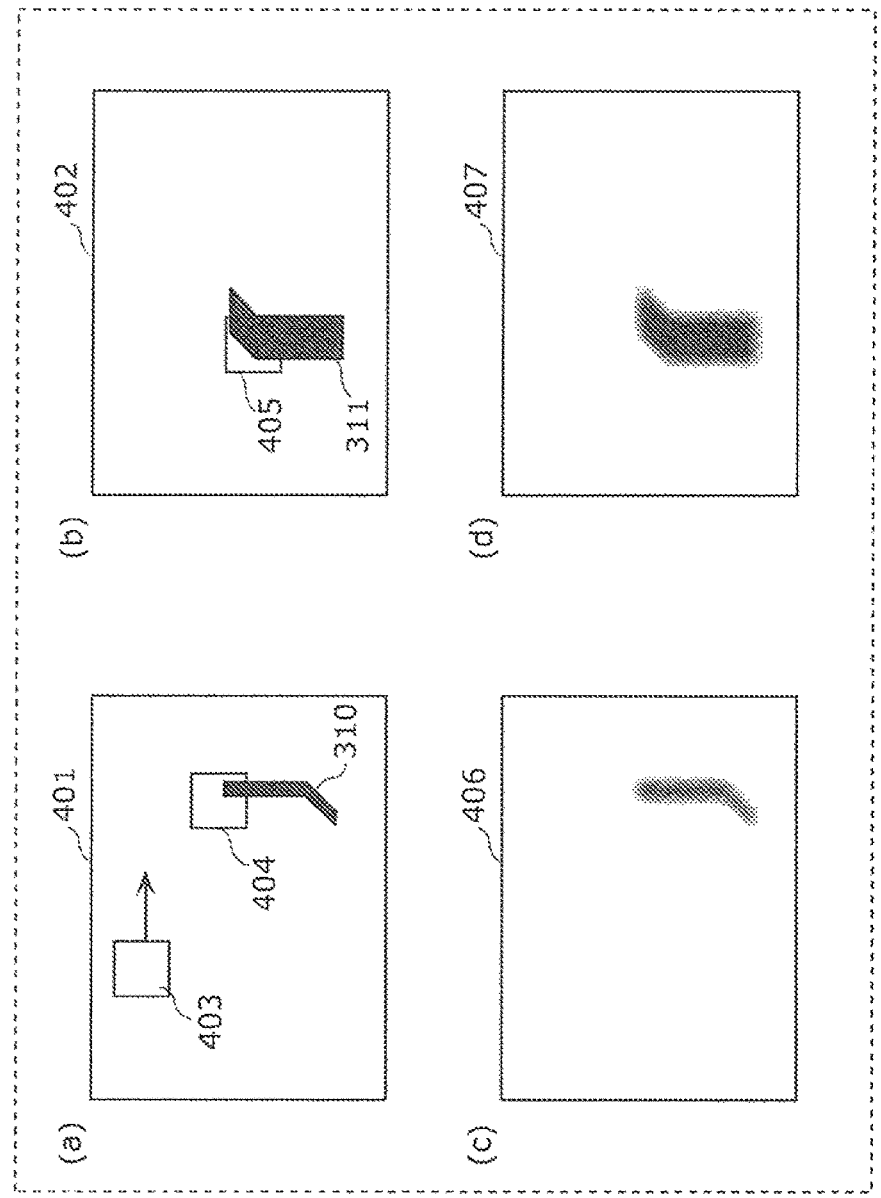
FIG. 4 is a diagram showing a hole density calculating method performed by a hole density calculating unit.

Next, a description is given of how the hole density calculating unit 103 performs a hole density calculating method. FIG. 4 is a diagram showing the hole density calculating method performed by the hole density calculating unit 103.

The hole density calculating unit 103 scans a window 403 in each of a hole map 401 ((a) in FIG. 4) obtained by extracting only the hole areas from the left different-viewpoint image 302 and a hole map 402 ((b) in FIG. 4) obtained by extracting only the hole areas from the right different-viewpoint image 303. Next, the hole density calculating unit 103 calculates, as a hole density Den, an occupation percentage of the hole area with respect to the whole window 403 when the pixel is overlapped with the center of the window 403, for each pixel (processing unit) in relation to each of the hole maps 401 and 402. The hole density calculating unit 103 calculates the hole density maps 406 and 407 composed of the calculated hole densities, according to Expression 2 below.

$$\text{Den}(x,y) = \Sigma \text{isHole}(H[x+dx, y+dy])/N \quad \text{(Expression 2)}$$

In Expression 2, N denotes a total number of pixels in the window, H[x+dx, y+dy] denotes components on the coordinates [x+dx, y+dy] in the hole map. In addition, dx and dy denote positions relative to the center of the window.

The hole density calculating unit 103 calculates the hole density Den of the pixel located at the coordinates (x, y) by calculating a total number of hole areas presented by H[x+dx, y+dy] and dividing the total number by N. For example, in FIG. 4, the hole density of the window 404 in the hole map 401 is smaller than the hole density of the window 405 in the hole map 402.

Figure 5:
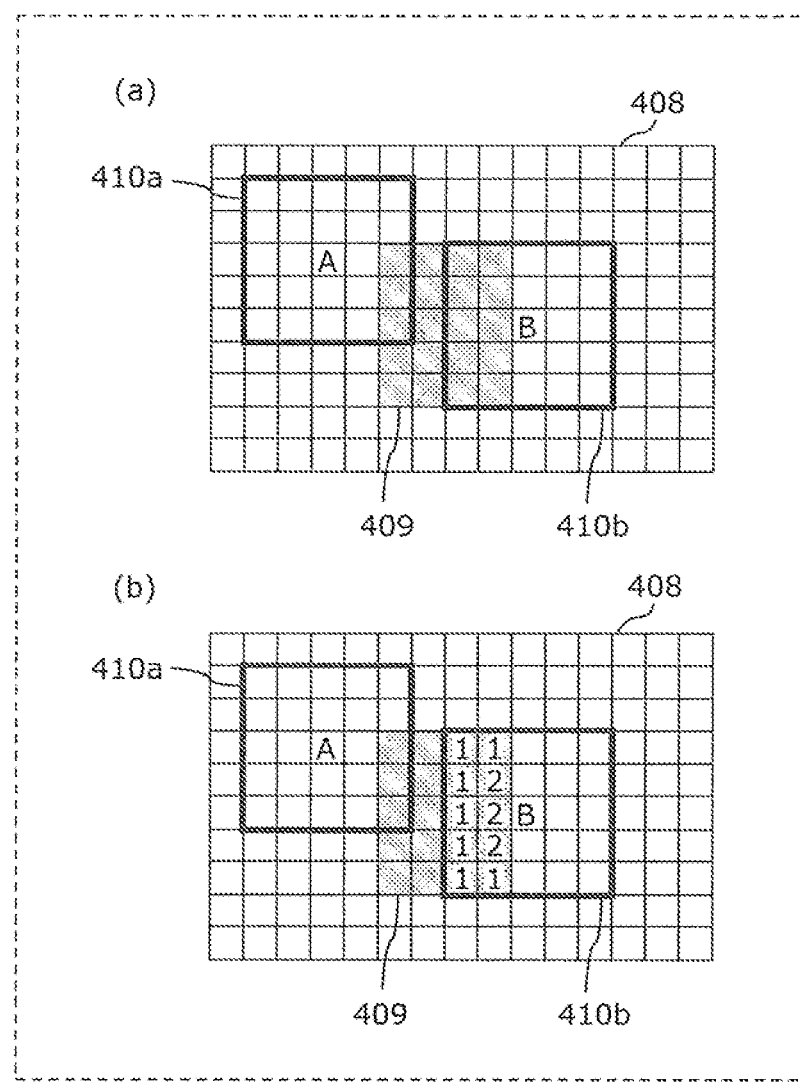
FIG. 5 is a schematic diagram for illustrating a specific example in which the hole density calculating method is performed.

Hereinafter, the hole density calculating method is described using a specific example as shown in FIG. 5. FIG. 5 is a schematic diagram for illustrating the specific example in which the hole density calculating method is performed.

In (a) of FIG. 5, a hole area 409 of 4×5 pixels is included in a hole map 408. The hole density of a pixel A is calculated as the number of pixels included in the hole area 409 with respect to a window 410a of 5×5 pixels having the pixel A as its center. In other words, the hole density of the pixel A is calculated as 3/25=0.12. Likewise, the hole density of a pixel B is calculated as the number of pixels included in the hole area 409 with respect to a window 410b and calculated as 10/25=0.4.

Here, the window may have a square or rectangular shape. The window may have a round or oval shape, without being limited to the rectangular shape.

In addition, the hole density calculating unit 103 may calculate a hole density Den by assigning different weights to a hole area located at a central part of a window and a hole area located at a peripheral part of the window.

For example, as shown in the calculation of the hole density of a pixel B in (b) of FIG. 5, the hole density calculating unit 103 calculates a pixel as two points for the hole area located at the central part of the window 401b, and calculates a pixel as one point for the hole area located at the peripheral part of the window 410b. In this way, a later-described combination ratio is calculated considering the positions of the hole areas within the window.

In addition, the size of the window may be specified by a user by inputting a parameter to the different-viewpoint image generating apparatus 100 of the user.

As described above, the hole density calculating unit 103 calculates hole densities for each of pixels in the left different-viewpoint image 302 and the right different-viewpoint image 303. The hole density map 406 ((c) of FIG. 4) is an image presenting the hole density calculated for each pixel in the left different-viewpoint image 302, and the hole density map 407 ((d) of FIG. 4) is an image presenting the hole density calculated for each pixel in the right different-viewpoint image 303.

As shown in the hole density maps 406 and 407, the pixel located around the edge of the hole area has a low hole density, and the pixel located around the center of the hole area has a high hole density.

Figure 6:
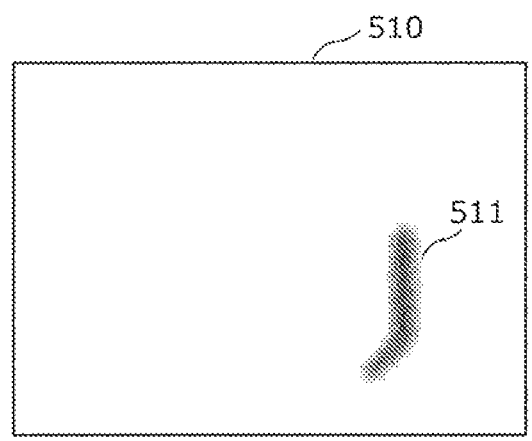
FIG. 6 is a diagram showing a combination ratio map which is generated by the combination ratio calculating unit.

Next, a description is given of the combination ratio calculating method performed by the combination ratio calculating unit 104. The combination ratio calculating unit 104 compares, for each pair of co-located pixels, hole densities in the hole density maps 406 and 407, and calculates the combination ratios (weights for mixture of the pixel values) to be used to combine the left-viewpoint image and the right-viewpoint image. As a result, a combination ratio map 510 as shown in FIG. 6 is generated.

In this embodiment, the combination ratio α takes a value from 0 to 1, and indicates a combination ratio of the left different-viewpoint image 302 with respect to the right different-viewpoint image 303. In other words, the pixel value of the left different-viewpoint image 302 is directly used for a pixel of α=1 instead of a pixel value of the right different-viewpoint image 303. On the other hand, the pixel value of the right different-viewpoint image 303 is directly used for a pixel of α=0 instead of a pixel value of the left different-viewpoint image 302.

The combination ratio α is calculated according to Expression 3 below $$\alpha=1:0 \geq \text{Den}(L)-\text{Den}(R)$$

$$\alpha=0:\text{Den}(L)-\text{Den}(R) \geq T$$

$$\alpha=1-((\text{Den}(L)-\text{Den}(R))/T):$$

$$0<\text{Den}(L)-\text{Den}(R)<T \quad \text{(Expression 3)}$$

Figure 7:
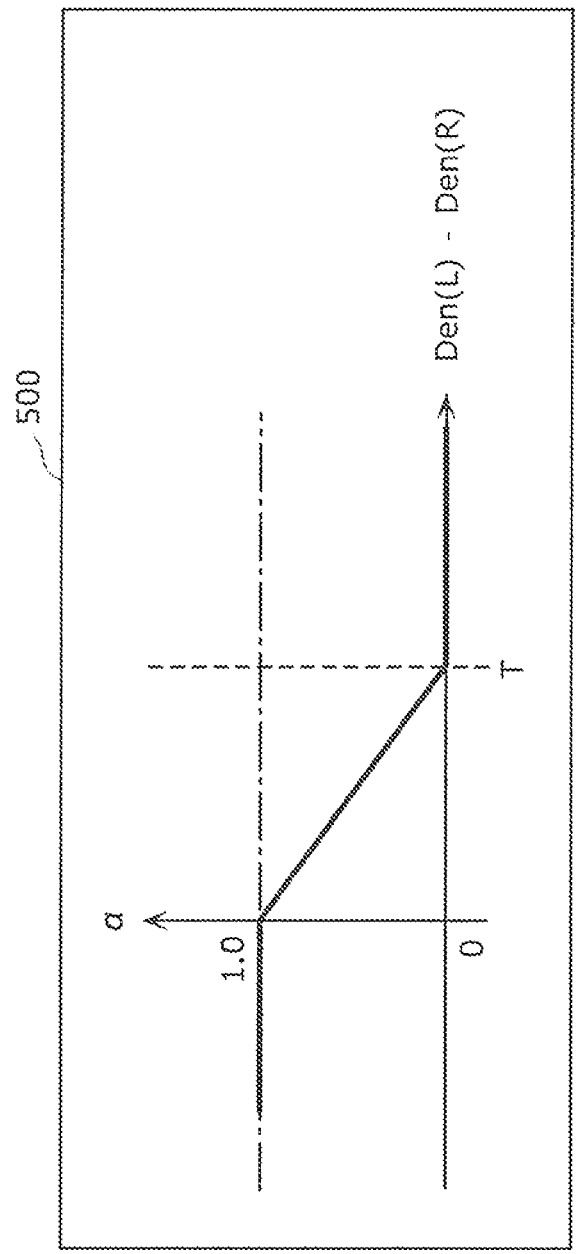
FIG. 7 is a diagram showing a relationship between the combination ratio α and a difference between a hole density of a left different-viewpoint image and a hole density of a right different-viewpoint image.

In Expression 3, Den (L) denotes the hole density of the left different-viewpoint image 302, Den (R) denotes the hole density of the right different-viewpoint image 303, and T denotes a threshold value. In addition, FIG. 7 is a diagram showing a difference between the hole density of the left different-viewpoint image 302 and the hole density of the right different-viewpoint image 303 calculated according to Expression 3, and a combination ratio α.

As for a pixel of Den(L)−Den(R)≤0, the combination ratio calculating unit 104 determines the combination ratio α of the left-viewpoint image to be 1. As for a pixel satisfying Den(L)−Den(R)≥a threshold value T, the combination ratio calculating unit 104 determines the combination ratio α of the left-viewpoint image to be 0. As for a pixel satisfying 0<Den(L)−Den(R)<T, the combination ratio calculating unit 104 determines the combination ratio linearly according to the magnitudes of Den (L) and Den (R).

In this way, the combination ratio calculating unit 104 calculates, for the set of co-located pixels, combination ratios of the two different-viewpoint images such that a larger one of the combination ratios is assigned to one of the different-viewpoint images which has a comparatively larger one of the hole densities.

Here, in the combination map 510 shown in FIG. 6, an area 511 (a non-white area) is an area of α<1, and the other area (a white area) is presented as α=1.

Here, in Expression 3, the threshold value T may be changed by the user by inputting a parameter to the different-viewpoint image generating apparatus 100 of the user. In addition, for a pixel satisfying 0<Den(L)−Den(R)<T, the combination ratio α may be determined linearly.

In this embodiment, as shown in FIG. 3, the distance from the left-viewpoint position 210 to the virtual-viewpoint position 301 is closer to the distance from the right-viewpoint position 220 to the virtual-viewpoint position 301. Thus, in principle, the pixel value of the left different-viewpoint image 302 having fewer hole areas is used as the pixel value of the different-viewpoint images after the combination.

Thus, the graph 500 shown in FIG. 7 has the horizontal axis presenting Den (L)–Den (R) (which is an expression as a basis of Expression 3). In the opposite case, when the distance from the left-viewpoint position 210 to the virtual-viewpoint position 301 is larger than the distance from the right-viewpoint position 220 to the virtual-viewpoint position 301, the graph as shown in FIG. 7 has the horizontal axis presenting Den (R)–Den (L) (which is an expression as a basis of Expression 3).

In this way, when Den(L)=Den(R) is satisfied, the combination ratio for the pixel value of the left different-viewpoint image 302 is large. In other words, when the hole densities are equal to each other, the combination ratio calculating unit 104 calculates, for each of the pair of pixels, a combination ratio of the two different-viewpoint images such that a larger one of the combination ratios is assigned to one of the different-viewpoint images which has a viewpoint position closer to the virtual-viewpoint position 301.

In this way, as a result, a larger number of pixel values in the image including a smaller number of hole areas are used in the different-viewpoint image (output image) after the combination. Thus, the different-viewpoint image generating apparatus 100 can generate the output image with a higher precision.

Here, the combination ratio calculating method may be any other calculating method, without being limited to the one according to Expression 3.

Next, a description is given of a hole area interpolation method performed by the hole area interpolating unit 105. The hole area interpolating unit 105 obtains the left different-viewpoint image 302 and the right different-viewpoint image 303 respectively from the left different-viewpoint image generating unit 101 and the right different-viewpoint image generating unit 102, and performs the hole embedment process (interpolation process) on the hole areas of the left different-viewpoint image 302 and the right different-viewpoint image 303.

Figure 8:
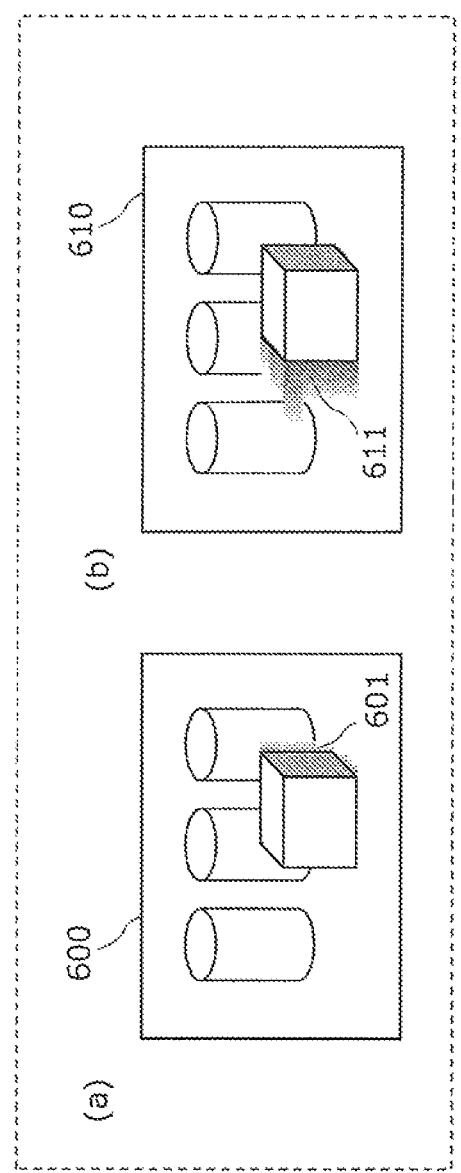
FIG. 8 is a schematic diagram showing a hole-embedded left different-viewpoint image and a hole-embedded right different-viewpoint image.

In this embodiment, the hole area interpolating unit 105 performs a hole embedment process using pixel values of pixels around a hole area. FIG. 8 is a schematic diagram showing a hole-embedded left different-viewpoint image (hereinafter also referred to as a left interpolated image) and a hole-embedded right different-viewpoint image (hereinafter also referred to as a right interpolated image).

FIG. 8 shows an example where the left interpolated image 600 ((a) in FIG. 8) and a right interpolated image 610 ((b) in FIG. 8) in the case where the hole area interpolating unit 105 performs a horizontal interpolation process (a linear interpolation process in a horizontal direction) using pixel values of pixels adjacent in the horizontal direction. When the horizontal interpolation process is used, an interpolated area 601 (which was a hole area originally) of the left interpolated image 600 shown in (a) of FIG. 8 is interpolated such that the pixel values of the pixels located left and right of the hole area are extended. This is true of an interpolated area 611 of the right interpolated image 610 shown in (b) of FIG. 8.

Here, the interpolation process (intra interpolation process) of the hole area interpolating unit 105 may be a process other than the linear interpolation process. For example, it is also good to compare depth values in depth maps at sets of coordinates adjacent to the hole area in the horizontal direction, and perform an extrapolation process using pixel values of pixels farther from the viewpoint.

Figure 9:
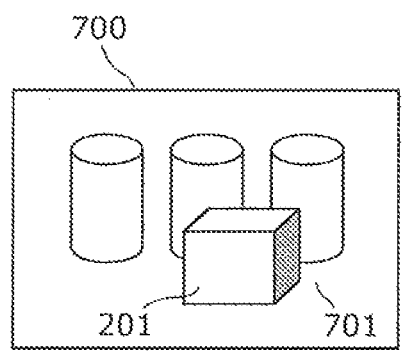
FIG. 9 is a diagram showing an output image which is generated by the different-viewpoint image combining unit.

Next, a description is given of an image combining method performed by the different-viewpoint image combining unit 106. The different-viewpoint image combining unit 106 obtains the left interpolated image 600 and the right interpolated image 610, and obtains the combination ratio map 510 from the hole density calculating unit 103. Next, the different-viewpoint image combining unit 106 generates an output image obtained by combining the two interpolated images (the left interpolated image 600 and the right interpolated image 610). FIG. 9 is a diagram showing an output image generated by the different-viewpoint image combining unit 106.

When the left interpolated image 600, the right interpolated image 610, and the combination ratio map 510 are respectively denoted as L (x, y), R (x, y), and α (x, y), an output image 700 (O (x, y)) is calculated according to Expression 4 below.

$$O(x,y)=L(x,y)\cdot\alpha(x,y)+R(x,y)\cdot\{1-\alpha(x,y)\} \quad \text{(Expression 4)}$$

The right side area 701 of a subject 201 in the output image 700 shown in FIG. 9 corresponds to an area 511 in the combination ratio map 510.

The pixels located at the central part of the right side area 701 are assigned with pixel values of the right interpolated image 610. The pixels located at the remaining area other than the right side area 701 are assigned with pixel values of the left interpolated image 600. The pixels located at the peripheral part of the right side area 701 are assigned with pixel values obtained by mixing the pixel values of the left interpolated image 600 and the pixel values of the right interpolated image 610 according to the combination ratio α.

Figure 10:
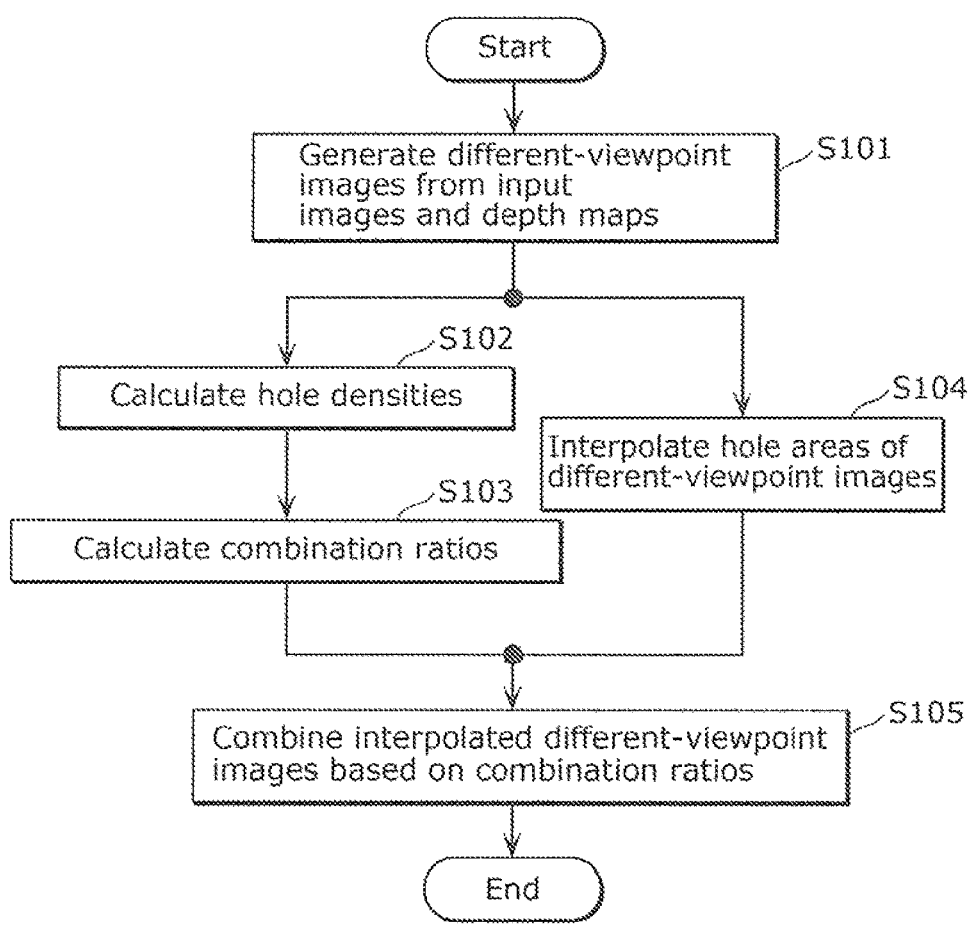
FIG. 10 is a flowchart of operations performed by the different-viewpoint image generating apparatus according to the embodiment.

Lastly, an order of operations by the different-viewpoint image generating apparatus 100 is described with reference to FIG. 10. FIG. 10 is a flowchart of operations by the different-viewpoint image generating apparatus 100.

First, the left different-viewpoint image generating unit 101 and the right different-viewpoint image generating unit 102 generate the left different-viewpoint image 302 and the right different-viewpoint image 303 from the input images (a left-viewpoint image 211 and a right-viewpoint image 221) and the depth maps thereof (S101).

Next, the hole density calculating unit 103 calculates, for each pixel, a hole density in each hole area in each of the left different-viewpoint image 302 and the right different-viewpoint image 303 (S102). Next, the combination ratio calculating unit 104 calculates the combination ratios at the time of combining the left different-viewpoint image 302 and the right different-viewpoint image 303 (S103).

In addition, the hole area interpolating unit 105 interpolates the hole areas in the left different-viewpoint image 302 and the right different-viewpoint image 303 (S104).

Lastly, the different-viewpoint image combining unit 106 combines the left different-viewpoint image and right different-viewpoint image interpolated in Step S104, based on the combination ratios calculated in Step S103 (S105).

Here, the order of Step S102, Step S103, and Step S104 is not specifically limited. The different-viewpoint image generating apparatus 100 may perform Step S102, Step S103, and Step S104 in this order, or may perform Step S104, Step S102, and Step S103 in this order. Alternatively, the processes in Step S102, Step S103, and Step S104 may be performed in parallel.

As described above, the different-viewpoint image generating apparatus 100 calculates the combination ratio map 510, using the hole density calculating unit 103 and the combination ratio calculating unit 104. Next, the different-viewpoint image combining unit 106 combines the two different-viewpoint images generated from the left-viewpoint image and the right-viewpoint image according to the calculated combination ratios.

In this way, an interpolation process is performed only on an area which requires interpolation in a hole area, and the combination ratios calculated based on a hole density is reflected in the interpolation process. Thus, the hole area is interpolated smoothly. In short, with the different-viewpoint image generating apparatus 100, it is possible to generate a high-quality image by interpolating the hole area in the different-viewpoint image. Stated differently, the different-viewpoint image generating apparatus 100 is capable of generating a high-quality different-viewpoint image (an output image).

Other Embodiments

The above embodiment has been described as an example of a technique disclosed in the present application. The technique in the present disclosure is not limited thereto, and is applicable to embodiments obtainable by arbitrarily providing some modification, replacement, addition, omission, etc. to the exemplary embodiment. In addition, it is also possible to conceive new embodiments by arbitrarily combining the structural elements described in the above embodiment.

In the above embodiment, two different-viewpoint images with interpolated hole areas are combined. However, it is also good to combine two different-viewpoint images with hole areas first, and then interpolate the hole areas in the combined image.

Figure 11:
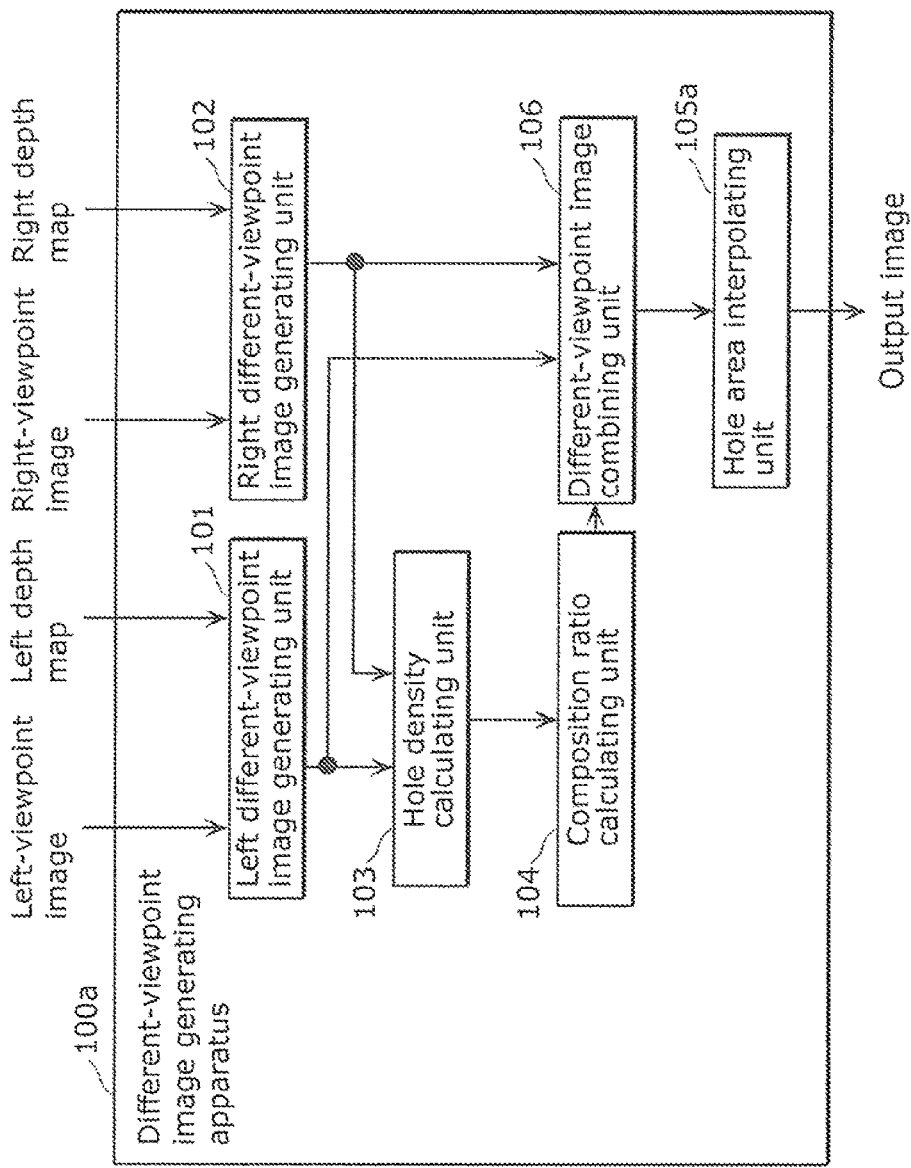
FIG. 11 is a diagram showing an overall structure of a different-viewpoint image generating apparatus according to an other embodiment.
Figure 12:
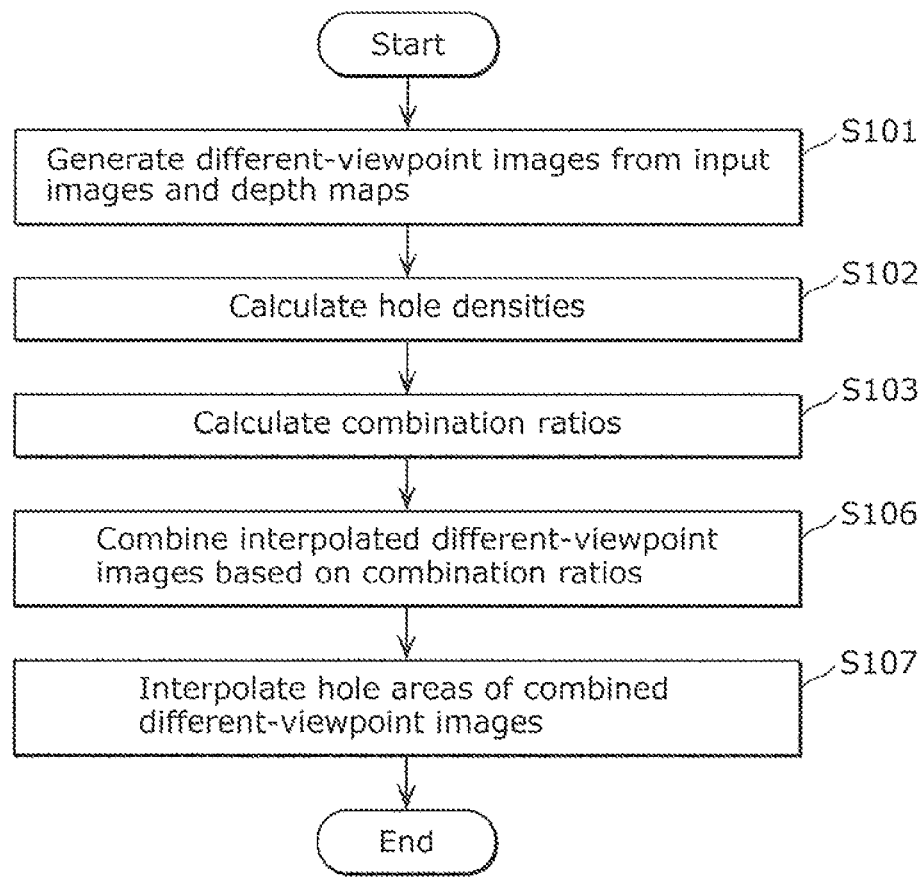
FIG. 12 is a flowchart of operations performed by the different-viewpoint image generating apparatus according to the other embodiment.

FIG. 11 is a diagram showing an overall structure of a different-viewpoint image generating apparatus 100a according to another embodiment. FIG. 12 is a flowchart of operations performed by the different-viewpoint image generating apparatus 100a. It is to be noted that differences from the different-viewpoint image generating apparatus 100 are mainly described below, and the same descriptions as in the above embodiment are not repeated below.

A different-viewpoint image combining unit 106 combines a left different-viewpoint image 302 and a right different-viewpoint image 303 according to combination ratios calculated by a combination ratio calculating unit 104 (S106 in FIG. 12). At this time, when both of corresponding pixels (co-located pixels having the same coordinates) of the left different-viewpoint image 302 and the right different-viewpoint image 303 are hole areas, the corresponding pixels are handled as hole areas. Accordingly, the image combined by the different-viewpoint image combining unit 106 includes the hole areas.

Next, the hole area interpolating unit 105a interpolates the hole areas in the image combined by the different-viewpoint image combining unit 106 using pixel values in the image (S107 in FIG. 12). The interpolation method for use at this time may be any known approach as described in the above embodiment.

The different-viewpoint image generating apparatus 100a is configured to be able to combine two different-viewpoint images by prioritizing pixel values in one of the images with a smaller number of hole areas. Accordingly, the different-viewpoint image generating apparatus 100a is capable of generating a high-quality different-viewpoint image (an output image).

In addition, in the above embodiment, each of the different-viewpoint image generating apparatuses 100 and 100a generates, from two images captured at mutually different viewpoint positions, two different-viewpoint images having viewpoint positions different from those of the two images. However, each of the different-viewpoint image generating apparatuses 100 and 100a may generate, from three or more images captured at mutually different viewpoint positions, three or more different-viewpoint images having viewpoint positions different from those of the two images.

More specifically, for example, each of the different-viewpoint image generating apparatuses 100 and 100a may generate, from three images captured at mutually different viewpoint positions, three different-viewpoint images having viewpoint positions different from those of the three images. In this case, the combination ratio calculating unit 104 calculates the combination ratios of the different-viewpoint images in proportion to the values of hole densities of the three images.

In the above embodiment, the hole density is calculated for each pixel. However, a hole density may be calculated for each processing unit composed of one or more pixels (for example, the processing unit is a 4×4 pixel block). In this case, a window is set for each processing unit, and hole densities are compared for each processing unit.

Each of the different-viewpoint image generating apparatuses 100 and 100a generates different-viewpoint images between two viewpoint positions from two images captured at mutually different viewpoint positions in the above embodiment, but it is capable of generating different-viewpoint images between viewpoint positions other than the two viewpoint positions. In addition, the two images do not always need to be images captured for stereoscopic viewpoint, and may be images including an identical subject.

Figure 13:
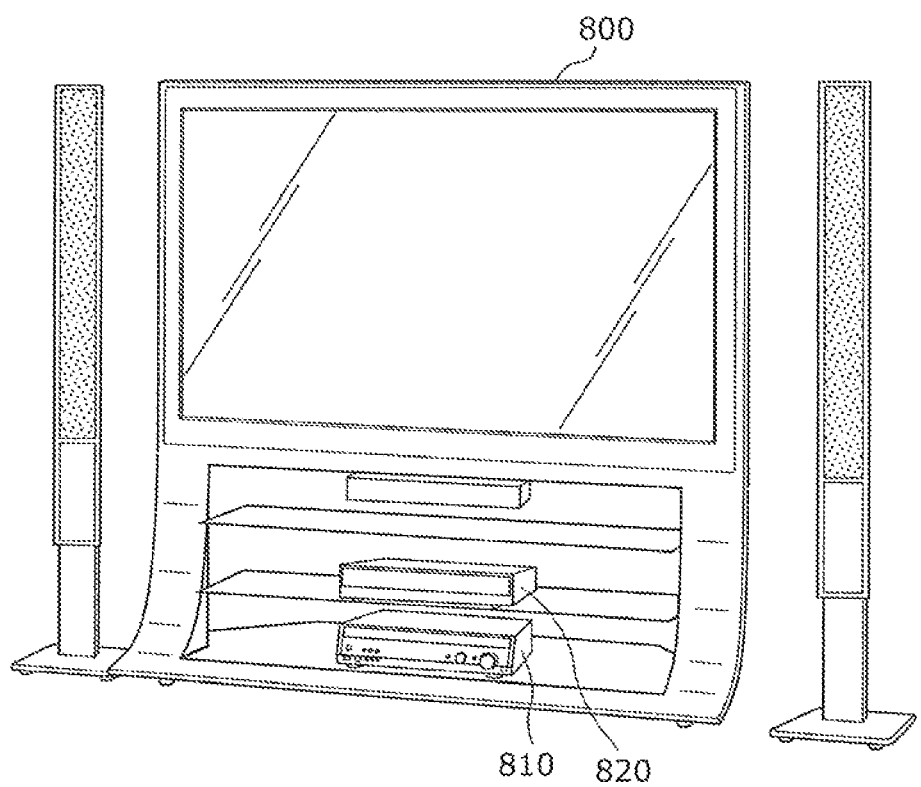
FIG. 13 is a first diagram showing an application example of any of the different-viewpoint image generating apparatuses.

For example, each of the different-viewpoint image generating apparatuses 100 and 100a is realized as a television receiver 800 as shown in FIG. 13. In this case, each of the different-viewpoint image generating apparatuses 100 and 100a generates different-viewpoint images from the two images captured in advance for stereoscopic viewpoint. Next, each of the different-viewpoint image generating apparatuses 100 and 100a is capable of displaying, for a user, a combination of two images selected from among the generated different-viewpoint images and the two images captured in advance for stereoscopic view. In this way, it is possible to configure the television receiver 800 which allows a user to adjust the disparity between images to be displayed, using a remote controller.

Alternatively, each of the different-viewpoint image generating apparatuses 100 and 100a may be realized as, for example, a Blu-Ray (registered trademark) player 810. In this case, each of the different-viewpoint image generating apparatuses 100 and 100a generates different-viewpoint mages from two images for stereoscopic view recorded on the Blu-Ray (registered trademark) disc to be mounted therein. Alternatively, each of the different-viewpoint image generating apparatuses 100 and 100a may be realized as a set top box 820. In this case, each of the different-viewpoint image generating apparatuses 100 and 100a generates different-viewpoint images from two images for stereoscopic view obtained through cable broadcasting or the like.

Figure 14:
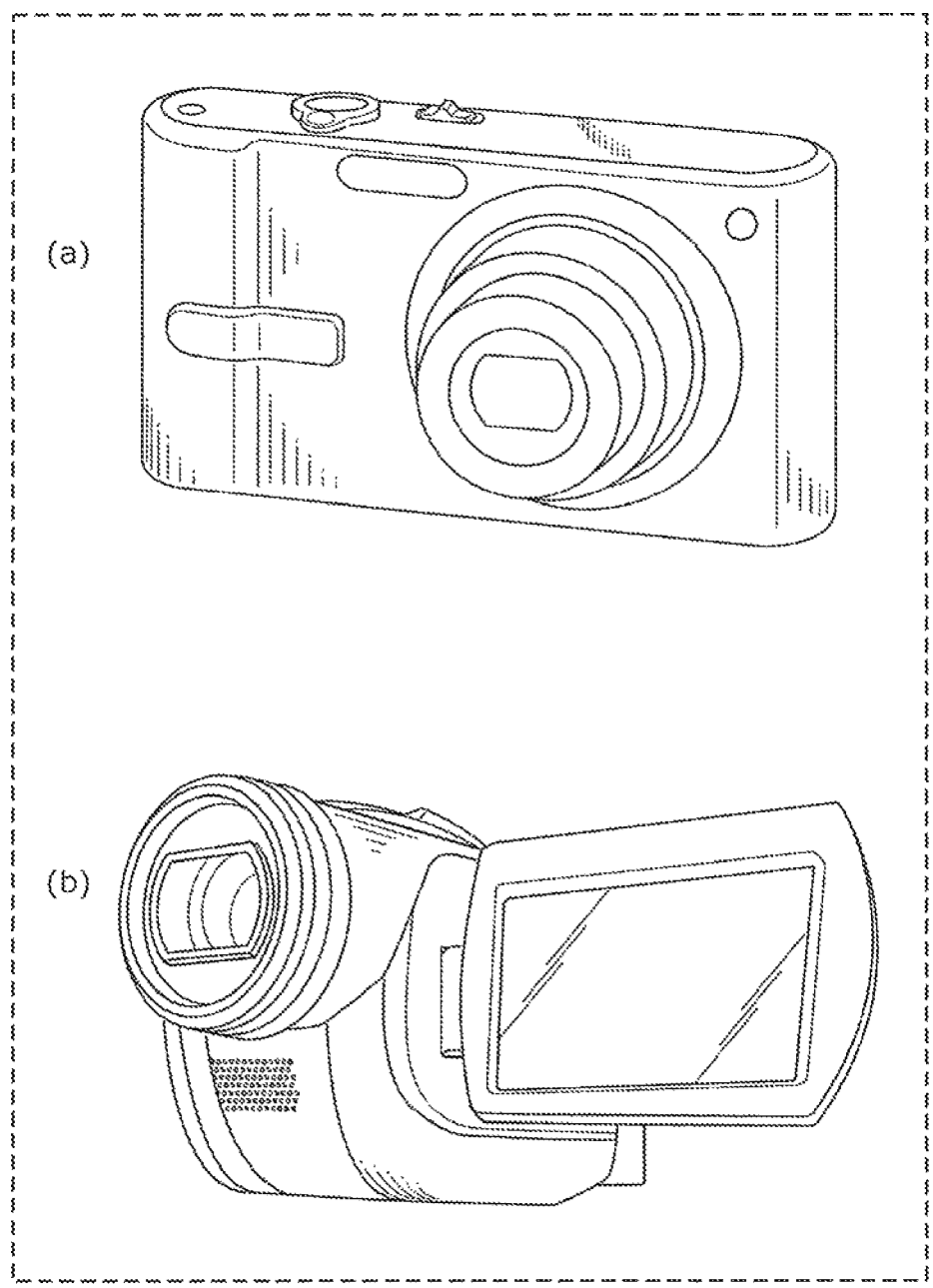
FIG. 14 is a second diagram showing an application example of any of the different-viewpoint image generating apparatuses.

Alternatively, each of the different-viewpoint image generating apparatuses 100 and 100a may be realized as a digital still camera (DSC) having a 3D image capturing function as shown in (a) in FIG. 14, or a digital video camera having a 3D image capturing function as shown in (b) in FIG. 14. Each of the different-viewpoint image generating apparatuses 100 and 100a generates different-viewpoint images from the two images captured in advance for stereoscopic view.

In addition, each of the different-viewpoint image generating apparatuses 100 and 100a may be realized using a sever and client system.

The different-viewpoint images generated by the different-viewpoint image generating apparatuses 100 and 100a are mainly used for disparity adjustment as described above, but may be used for any other purposes.

In addition, the present disclosure includes the cases described below.

(1) Each of the different-viewpoint image generating apparatuses is, specifically, a computer system including a microprocessor, a ROM, a RAM, a hard disk unit, a display unit, a keyboard, a mouse, and so on. A computer program is stored in the RAM or hard disk unit. The different-viewpoint image generating apparatus achieves its functions through the microprocessor's operations according to the computer program. Here, in order to achieve predetermined functions, the computer program is configured by combining plural instruction codes indicating instructions for the computer.

(2) A part or all of the structural elements of the different-viewpoint image generating apparatus may be configured with a single system-LSI (Large-Scale Integration). The system-LSI is a super-mufti-function LSI manufactured by integrating structural units on a single chip, and is specifically a computer system configured to include a microprocessor, a ROM, a RAM, and so on. A computer program is stored in the RAM. The system-LSI achieves its function through the microprocessor's operations according to the computer program.

(3) A part or all of the constituent elements constituting the different-viewpoint image generating apparatus may be configured as an IC card which can be attached to and detached from the respective apparatuses or as a stand-alone module. The IC card or the module is a computer system configured from a microprocessor, a ROM, a RAM, and so on. The IC card or the module may also be included in the aforementioned super-multi-function LSI. The IC card or the module achieves its functions through the microprocessor's operations according to the computer program. The IC card or the module may also be implemented to be tamper-resistant.

(4) The present disclosure may be any of the methods described above. In addition, any of the methods may be implemented as computer programs for executing the above-described method, using a computer, and may also be implemented as digital signals including the computer programs.

Furthermore, the present disclosure may also be implemented as computer programs or digital signals recorded on computer-readable recording media such as a flexible disc, a hard disk, a CD-ROM, an MO, a DVD, a DVD-ROM, a DVD-RAM, a BD (Blu-ray (registered trademark) Disc), and a semiconductor memory. Furthermore, the present disclosure may also be implemented as the digital signals recorded on these recording media.

Furthermore, the present disclosure may also be implemented as the aforementioned computer programs or digital signals transmitted via a telecommunication line, a wireless or wired communication line, a network represented by the Internet, a data broadcast, and so on.

The present disclosure may also be implemented as a computer system including a microprocessor and a memory, in which the memory stores the aforementioned computer program and the microprocessor operates according to the computer program.

Furthermore, it is also possible to execute another independent computer system by transmitting the programs or the digital signals recorded on the aforementioned recording media, or by transmitting the programs or digital signals via the aforementioned network and the like.

(5) The embodiments and variations thereof may be arbitrarily combined.

It is to be noted that the present disclosure is not limited to the embodiments and variations thereof. The present disclosure includes various kinds of modifications that would be conceived by any person skilled in the art and made to the embodiments and variations thereof and other embodiments that would be configured by any person skilled in the art by combining the structural elements in different embodiments and variations thereof, without deviating from the scope of the present invention.

INDUSTRIAL APPLICABILITY

With the different-viewpoint image generating apparatus and the different-viewpoint image generating method according to the present disclosure, it is possible to generate high-quality different-viewpoint images from images including depth map information captured by an imaging device. The configurations thereof are applicable, for example, to consumer or industrial imaging devices (digital still cameras and video cameras), or devices such as mobile terminals.

REFERENCE SIGNS LIST 100, 100a Different-viewpoint image generating apparatus
101 Left different-viewpoint image generating unit
102 Right different-viewpoint image generating unit
103 Hole density calculating unit
104 Combination ratio calculating unit
105, 105a Hole area interpolating unit
106 Different-viewpoint image combining unit
201, 202 Subject
210 Left-viewpoint position
211 Left-viewpoint image
212 Left depth map
220 Right-viewpoint position
221 Right-viewpoint image
222 Right depth map
301 Virtual-viewpoint position
302 Left different-viewpoint image
303 Right different-viewpoint image
310, 311, 409 Hole area
401, 402, 408 Hole map
403, 404, 405, 410a, 410b window
406, 407 Hole density map
500 Graph
510 Combination ratio map
511 Area
600 Left interpolated image
610 Right interpolated image
601, 611 Interpolation target area
700 Output image
701 Right side area
800 Television receiver
810 Blu-Ray (registered trademark) player
820 Set top box

The invention claimed is:

1. A different-viewpoint image generating apparatus comprising:
   a processor; and
   a non-transitory computer-readable medium having stored thereon executable instructions that, when executed by the processor, cause the different-viewpoint image generating apparatus to function as:
   a different-viewpoint image generating unit configured to generate, from each of two or more images respectively obtained at two or more viewpoint positions, one of two or more different-viewpoint images which correspond to an image obtainable at a virtual viewpoint position different from the two or more viewpoint positions, based on distance information indicating a depth of a pixel in one of the two or more images, the one of the two or more different-viewpoint images including a hole area in which a pixel value is missing;
   a hole density calculating unit configured to calculate, for each of processing units respectively in predetermined areas in the two or more different-viewpoint images, a hole density indicating, with respect to the predetermined area, a ratio of one of the hole areas in the processing units in the two or more different-viewpoint images, the processing unit being made up of one or more pixels;
   a combination ratio calculating unit configured to calculate, for each of the processing units, a combination ratio of one of the two or more different-viewpoint images, based on the hole density of the processing unit which is co-located with an other one of the processing units in an other one of the two or more different-viewpoint images; and
   a different-viewpoint image combining unit configured to combine the two or more different-viewpoint images, based on the combination ratios of the processing units,
   wherein the hole density calculating unit is configured to calculate, as a plurality of the hole densities of the co-located processing units in the two or more different-viewpoint images, a plurality of the ratios of the hole areas in windows which are the predetermined areas having the co-located processing units as centers of the predetermined areas, and
   wherein the hole density calculating unit is configured to calculate a plurality of the hole densities by assigning different weights to a hole area located at a central part of the window and a hole area located at a peripheral part of the window.

2. The different-viewpoint image generating apparatus according to claim 1,
   wherein the executable instructions, when executed by the processor, cause the different-viewpoint image generating apparatus to further function as a hole area interpolating unit configured to interpolate each of the hole areas in the two or more different-viewpoint images, using pixel values within a corresponding one of the two or more different-viewpoint images,
   wherein the different-viewpoint image combining unit is configured to combine the two or more different-viewpoint images including the interpolated hole areas, based on the combination ratios.

3. The different-viewpoint image generating apparatus according to claim 1,
   wherein the executable instructions, when executed by the processor, cause the different-viewpoint image generating apparatus to further function as a hole area interpolating unit configured to interpolate the hole areas within images combined by the different-viewpoint image combining unit, using pixel values within the images.

4. The different-viewpoint image generating apparatus according to claim 1,
   wherein the combination ratio calculating unit is configured to calculate, for the co-located processing units in the two or more different-viewpoint images, a plurality of the combination ratios which become larger as a plurality of the hole densities of the co-located processing units become smaller.

5. The different-viewpoint image generating apparatus according to claim 1,
   wherein, when hole densities of co-located processing units are equal to each other between the two or more different-viewpoint images, the combination ratio calculating unit is configured to calculate, for the co-located processing units having the equal hole densities, combination ratios which become larger as the positions of the two or more different-viewpoint images become closer to the position of the virtual viewpoint position.

6. The different-viewpoint image generating apparatus according to claim 1,
   wherein the processing unit is a pixel,
   the hole density calculating unit is configured to calculate a hole density for each of pixels co-located in the two or more different-viewpoint images, and
   the combination ratio calculating unit is configured to calculate, for each of the co-located pixels, the combination ratio of one of the two or more different-viewpoint images.

7. A different-viewpoint image generating method comprising:
   generating, from each of two or more images respectively obtained at two or more viewpoint positions, one of two or more different-viewpoint images which correspond to an image obtainable at a virtual viewpoint position different from the two or more viewpoint positions, based on distance information indicating a depth of a pixel in one of the two or more images, the one of the two or more different-viewpoint images including a hole area in which a pixel value is missing;
   calculating, for each of processing units respectively in predetermined areas in the two or more different-viewpoint images, a hole density indicating, with respect to the predetermined area, a ratio of one of the hole areas in the processing units in the two or more different-viewpoint images, the processing unit being made up of one or more pixels;
   calculating, for each of the processing units, a combination ratio of one of the two or more different-viewpoint images, based on the hole density of the processing unit which is co-located with an other one of the processing units in an other one of the two or more different-viewpoint images; and
   combining the two or more different-viewpoint images, based on the combination ratios of the processing units,
   wherein the calculating of the hole density comprises calculating, as a plurality of the hole densities of the co-located processing units in the two or more different-viewpoint images, a plurality of the ratios of the hole areas in windows which are the predetermined areas having the co-located processing units as centers of the predetermined areas, and
   wherein, in the calculating of the hole density, a plurality of the hole densities are calculated by assigning different weights to a hole area located at a central part of the window and a hole area located at a peripheral part of the window.

8. A non-transitory computer-readable recording medium for use in a computer, the recording medium having a computer program recorded thereon for causing the computer to execute the different-viewpoint image generating method according to claim 7.

9. An integrated circuit comprising:
- a different-viewpoint image generating circuit configured to generate, from each of two or more images respectively obtained at two or more viewpoint positions, one of two or more different-viewpoint images which correspond to an image obtainable at a virtual viewpoint position different from the two or more viewpoint positions, based on distance information indicating a depth of a pixel in one of the two or more images, the one of the two or more different-viewpoint images including a hole area in which a pixel value is missing;
- a hole density calculating circuit configured to calculate, for each of processing units respectively in predetermined areas in the two or more different-viewpoint images, a hole density indicating, with respect to the predetermined area, a ratio of one of the hole areas in the processing units in the two or more different-viewpoint images, the processing unit being made up of one or more pixels;
- a combination ratio calculating circuit configured to calculate, for each of the processing units, a combination ratio of one of the two or more different-viewpoint images, based on the hole density of the processing unit which is co-located with an other one of the processing units in an other one of the two or more different-viewpoint images; and
- a different-viewpoint image combining circuit configured to combine the two or more different-viewpoint images, based on the combination ratios of the processing units, wherein the hole density calculating circuit is configured to calculate, as a plurality of the hole densities of the co-located processing units in the two or more different-viewpoint images, a plurality of the ratios of the hole areas in windows which are the predetermined areas having the co-located processing units as centers of the predetermined areas, and wherein the hole density calculating circuit is configured to calculate a plurality of the hole densities by assigning different weights to a hole area located at a central part of the window and a hole area located at a peripheral part of the window.

10. The different-viewpoint image generating apparatus according to claim 1,
wherein the hole density calculating unit is configured to calculate the plurality of the hole densities by assigning a larger weight to the hole area located at the central part of the window than the hole area located at the peripheral part of the window.

* * * * *